(12) United States Patent
Fu et al.

(10) Patent No.: US 9,672,954 B2
(45) Date of Patent: Jun. 6, 2017

(54) FLAME RETARDANT THERMOPLASTIC COMPOSITION OF POLYCARBONATE AND POLYPROPYLENE

(75) Inventors: Lin Fu, Naperville, IL (US); Caroline H. Laufer, Millington, NJ (US); Thomas S. Lin, Whippany, NJ (US); Matthew T. Bishop, Midland, MI (US); Hamed Lakrout, Midland, MI (US); William J. Harris, Lake Jackson, TX (US)

(73) Assignee: DOW GLOBAL TECHNOLOGIES LLC, Midland, MI (US)

( * ) Notice: Subject to any disclaimer, the term of this patent is extended or adjusted under 35 U.S.C. 154(b) by 529 days.

(21) Appl. No.: 14/344,445

(22) PCT Filed: Sep. 13, 2012

(86) PCT No.: PCT/US2012/055084
§ 371 (c)(1),
(2), (4) Date: Mar. 12, 2014

(87) PCT Pub. No.: WO2013/048754
PCT Pub. Date: Apr. 4, 2013

(65) Prior Publication Data
US 2015/0010755 A1 Jan. 8, 2015

Related U.S. Application Data

(60) Provisional application No. 61/541,276, filed on Sep. 30, 2011.

(51) Int. Cl.
*H01B 3/42* (2006.01)
*C08L 69/00* (2006.01)
(Continued)

(52) U.S. Cl.
CPC .............. *H01B 3/426* (2013.01); *C08L 23/10* (2013.01); *C08L 69/00* (2013.01); *H01B 3/421* (2013.01);
(Continued)

(58) Field of Classification Search
CPC .......... H01B 3/426; H01B 7/29; H01B 7/292; H01B 7/295; C08L 69/00; C08L 23/10; C08L 23/12; C08L 51/06; C09D 169/00
See application file for complete search history.

(56) References Cited

U.S. PATENT DOCUMENTS 3,236,917 A 2/1966 Natta et al.
4,568,723 A 2/1986 Lu
(Continued)

FOREIGN PATENT DOCUMENTS

EP 0135726 A2 4/1985
EP 0459766 A1 12/1991
(Continued)

OTHER PUBLICATIONS

Machine Translation of JP 2011-132312 A (2011).*
Wildes et al., Polymer 40, 1999, 3069-3082.

*Primary Examiner* — Scott R Walshon
(74) *Attorney, Agent, or Firm* — Husch Blackwell LLP

(57) ABSTRACT

A composition comprising (A) at least one bisphenol-A polycarbonate resin, (B) at least one polypropylene, preferably a high crystallinity polypropylene, (C) at least one compatibilizer comprising an amine functionalized elastomeric polymer, (D) at least one organic phosphate flame retardant, preferably an organic phosphate that is liquid at room temperature, and, optionally, (E) one or more additives. These compositions are useful in the manufacture of wire insulation coatings of less than 0.2 mm with good scrape abrasion resistance.

10 Claims, 1 Drawing Sheet

(51) Int. Cl.
  *C08L 23/10* (2006.01)
  *H01B 7/295* (2006.01)
  *C08K 5/521* (2006.01)
  *C08L 51/06* (2006.01)

(52) U.S. Cl.
  CPC ............ *H01B 7/295* (2013.01); *C08K 5/521* (2013.01); *C08L 51/06* (2013.01); *C08L 2201/02* (2013.01); *C08L 2203/202* (2013.01); *C08L 2205/03* (2013.01); *C08L 2205/08* (2013.01); *Y10T 428/2933* (2015.01)

(56) References Cited

U.S. PATENT DOCUMENTS

| | | | |
|---|---|---|---|
| 5,194,509 A | 3/1993 | Hasenbein et al. | |
| 5,244,970 A | 9/1993 | Kobayashi et al. | |
| 5,272,236 A | 12/1993 | Lai et al. | |
| 5,278,272 A | 1/1994 | Lai et al. | |
| 5,455,292 A * | 10/1995 | Kakegawa | C08K 5/523 524/127 |
| 5,859,099 A * | 1/1999 | Kasowski | C08K 5/34928 524/100 |
| 5,986,028 A | 11/1999 | Lai et al. | |
| 6,200,679 B1 * | 3/2001 | Hase | C09K 21/14 174/110 PM |
| 6,472,473 B1 | 10/2002 | Ansems et al. | |
| 6,841,620 B2 | 1/2005 | Ansems et al. | |
| 6,960,635 B2 | 11/2005 | Stevens et al. | |
| 7,355,089 B2 | 4/2008 | Chang et al. | |
| 7,504,347 B2 | 3/2009 | Poon et al. | |
| 7,514,517 B2 | 4/2009 | Hoenig et al. | |
| 7,524,911 B2 | 4/2009 | Karjala et al. | |
| 7,579,408 B2 | 8/2009 | Walton et al. | |
| 7,582,716 B2 | 9/2009 | Liang et al. | |
| 7,662,876 B2 * | 2/2010 | Burk | C08K 5/0066 524/265 |
| 7,952,029 B2 * | 5/2011 | Hase | H01B 3/30 174/110 R |
| 2006/0014864 A1 | 1/2006 | Braig et al. | |
| 2007/0066737 A1 * | 3/2007 | Gallucci | C08L 79/08 524/430 |
| 2010/0143651 A1 | 6/2010 | Silvis et al. | |
| 2010/0311920 A1 | 12/2010 | Gonzalez et al. | |
| 2011/0065845 A1 * | 3/2011 | Papazoglou | C08L 23/10 524/101 |
| 2011/0196097 A1 | 8/2011 | Nomura et al. | |

FOREIGN PATENT DOCUMENTS

| | | | |
|---|---|---|---|
| EP | 2292694 A1 | 3/2011 | |
| JP | 04296366 A * | 10/1992 | |
| JP | H058916 A | 1/1993 | |
| JP | H06124451 A | 5/1994 | |
| JP | WO 2011078138 A1 * | 6/2011 | ............ C08L 69/00 |
| JP | 2011132312 A | 7/2011 | |
| WO | 2006/102016 A2 | 9/2006 | |
| WO | 2008/079784 A2 | 7/2008 | |
| WO | 2010/140040 A1 | 12/2010 | |

* cited by examiner

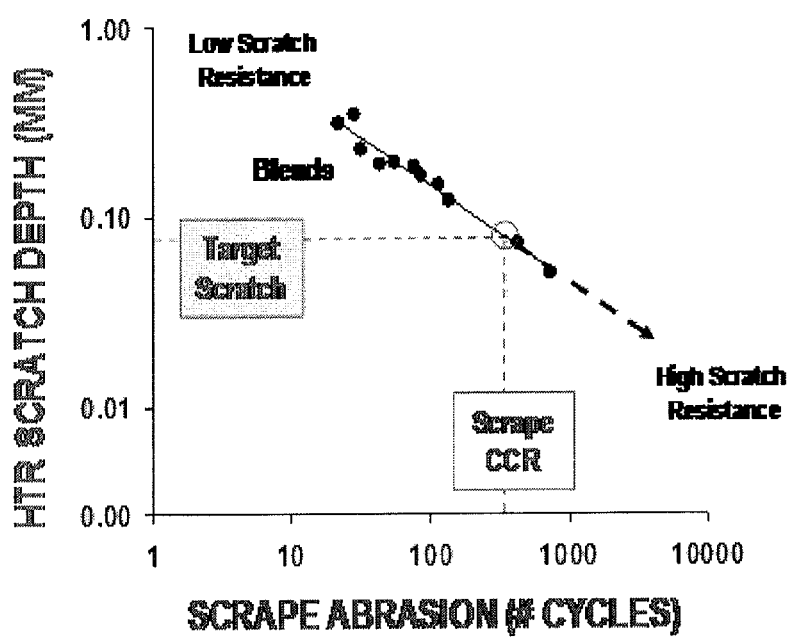

US 9,672,954 B2

FLAME RETARDANT THERMOPLASTIC COMPOSITION OF POLYCARBONATE AND POLYPROPYLENE

CROSS REFERENCE TO RELATED APPLICATION

The present application is the national phase of PCT Patent Application No. PCT/US2012/055084 filed Sep. 13, 2012, which claims priority to U.S. Provisional Application No. 61/541,276, filed Sep. 30, 2011, the entire content of which is incorporated by reference herein.

BACKGROUND OF THE INVENTION

1. Field of the Invention

This invention relates to flame retardant compositions. In one aspect the invention relates to flame retardant compositions comprising polycarbonate and polypropylene while in another aspect, the invention relates to the use of such compositions in the manufacture of automotive wire coatings.

2. Description of the Related Art

One of the automotive wire market trends is downgauging wire size and insulation thickness so that original equipment manufacturers (OEM) can install more wires in a harness assembly to meet increasing demands of power and information and entertainment ("infotainment") systems around the car. The thickness of the automotive wire insulation can vary from 0.2 millimeter (mm) to 1.6 mm depending on the conductor sizes specified in auto wire standards such as ISO 6722. There is a trend in the market to install more wires with the insulation thickness of 0.2 mm as specified in ISO 6722. The reduced wall thickness makes it very challenging to meet the wire performance requirements (e.g. sandpaper abrasion resistance, scrape abrasion resistance, and pinch resistance).

SUMMARY OF THE INVENTION

In one embodiment the invention is a composition comprising (A) at least one bisphenol-A polycarbonate resin, (B) at least one polypropylene, preferably a high crystallinity polypropylene, with a melt flow rate (MFR)≤12 g/10 min (230° C./2.16 kg), (C) at least one compatibilizer comprising an amine functionalized elastomeric polymer, (D) at least one organic phosphate flame retardant, preferably an organic phosphate that is liquid at room temperature (23° C.), and (E) optionally, one or more additives.

In one embodiment the invention is a composition comprising in weight percent based on the weight of the composition:
  A. 35-80% of at least one bisphenol-A polycarbonate resin,
  B. 10-35% of at least one polypropylene with an MFR≤12 g/10 min (230° C./2.16 kg),
  C. Greater than zero (>) to 40% of at least one amine functionalized elastomeric polymer,
  D. >0-30% of at least one organic phosphate flame retardant, and,
  E. 0-10% of one or more additives; and
the weight ratio of A to B is greater than (>) 1.

In one embodiment the composition of this invention is free of halogens, magnesium hydroxide (Mg(OH)$_2$) and polymeric phosphites. In one embodiment the compatibilizer is free of units derived from styrene and does not contain epoxy groups. In one embodiment the composition is of low density (relative to a composition similarly formulated except further comprising more than 10 percent by weight of inorganic filler).

In one embodiment the invention is an insulation wire covering, i.e., sheath, that shows one or more of robust sandpaper abrasion resistance, scrape abrasion resistance, pinch resistance, flame resistance, and hot water resistance for automotive wires with reduced wall thickness (e.g., 0.2 mm or less) according to ISO 6722.

BRIEF DESCRIPTION OF THE DRAWINGS

The FIGURE is a graph reporting the correlation between scratch resistance and scrap abrasion resistance for various comparative and inventive compositions.

DETAILED DESCRIPTION OF THE PREFERRED EMBODIMENT

Definitions

The numerical ranges in this disclosure are approximate, and thus may include values outside of the range unless otherwise indicated. Numerical ranges include all values from and including the lower and the upper values, in increments of one unit, provided that there is a separation of at least two units between any lower value and any higher value. As an example, if a compositional, physical or other property, such as, for example, molecular weight, etc., is from 100 to 1,000, then all individual values, such as 100, 101, 102, etc., and sub ranges, such as 100 to 144, 155 to 170, 197 to 200, etc., are expressly enumerated. For ranges containing values which are less than one or containing fractional numbers greater than one (e.g., 1.1, 1.5, etc.), one unit is considered to be 0.0001, 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this disclosure. Numerical ranges are provided within this disclosure for, among other things, the amounts of the components of the composition.

"Polymer" means a compound prepared by reacting (i.e., polymerizing) monomers, whether of the same or a different type. The generic term polymer thus embraces the term "homopolymer", usually employed to refer to polymers prepared from only one type of monomer, and the term "interpolymer" as defined below.

"Interpolymer" means a polymer prepared by the polymerization of at least two different types of monomers. This generic term includes both classical copolymers, i.e., polymers prepared from two different types of monomers, and polymers prepared from more than two different types of monomers, e.g., terpolymers, tetrapolymers, etc.

"Mer", "mer unit" and like terms means that portion of a polymer derived from a single reactant molecule; for example, a mer unit derived from ethylene has the general formula —CH$_2$CH$_2$—.

"Olefin" and like terms mean an unsaturated, aliphatic or alicyclic, substituted or unsubstituted hydrocarbon having one or more double bonds. "Substituted olefin" means an olefin in which one or more hydrogen atoms bound to any carbon of the olefin is replaced by another group such as a halogen, aryl, substituted aryl, cycloalkyl, substituted cycloalkyl, hetero-cycloalkyl, substituted hetero-cycloalkyl, halogen, haloalkyl, hydroxy, phosphido, alkoxy, amino, thio, nitro, or a combinations of two or more such substituents.

"Elastomer" and like terms means a rubber-like polymer that (i) can be stretched to at least twice its original length and which retracts very rapidly to approximately its original length when the force exerting the stretching is released, and (ii) has a glass transition temperature (Tg) which is equal to or less than 0° C.

"Olefin elastomer" and like terms mean an elastomeric polymer comprising at least 50 mole percent (mol %) of units derived from one or more olefins.

"Blend," "polymer blend" and like terms mean a composition of two or more polymers. Such a blend may or may not be miscible. Such a blend may or may not be phase separated. Such a blend may or may not contain one or more domain configurations, as determined from transmission electron spectroscopy, light scattering, x-ray scattering, and any other method known in the art.

"Composition", "formulation" and like terms means a mixture or blend of two or more components. In the context of this invention, the composition includes Components A-D plus any additives, fillers and the like.

"Free of", "substantially free of" and like terms mean that the compositions of this invention are without or substantially without content of a particular substance, e.g., halogen, metal oxide, etc., as measured by a conventional analytical method for that substance. For example, "halogen free" means that the compositions of this invention are without or substantially without halogen content, i.e., the composition contains less than 2000 mg/kg of halogen as measured by ion chromatography (IC). If a composition is free or substantially free of a substance, then whatever amount of that substance may be in the composition is such that its affect on the efficacy of the composition is considered as inconsequential.

Density for both polypropylene and polycarbonate is measured by ASTM D792.

Melt flow rate (MFR), also known as melt index (MI), for both polypropylene and polycarbonate is measured by ASTM D1238.

1% Secant Flexural modulus for polypropylene is measured by ASTM D790A.

Notched Izod impact at 23° C. for polypropylene is measured by ASTM D256A.

Deflection temperature under a load of 0.45 MPa for polypropylene is measured by ASTM D648.

Flexural modulus for polycarbonate is measured by ASTM D790.

Notched Izod impact for polycarbonate is measured by ASTM D256.

Tensile elongation at break for polycarbonate is measured by ASTM D638.

Tensile strength at break for polycarbonate is measured by ASTM D638.

Polycarbonate (Component A)

Illustrative of the polycarbonates useful in the practice of this invention are halogen-free and are described in U.S. Pat. No. 3,431,224. These polycarbonates are aromatic carbonate polymers prepared by reacting a dihydric phenol with a carbonate precursor such as phosgene, a haloformate or a carbonate. One preferred polycarbonate is poly(2,2-diphenyl propane)-carbonate. Typically, the polycarbonate will have a melt index (MI) of less than or equal to ($\leq$) 75 grams per ten minutes (g/10 min), more preferably $\leq$20 g/10 min, (250° C./1.2 kilograms (kg)). Typically, the polycarbonate will have a tensile elongation at break greater than 50%, preferably greater than 100%. In one embodiment the polycarbonate is impact modified.

Polypropylene (Component B)

The polypropylene used in the practice of this invention is a polymer having at least half of its mer units derived from propylene. These include homopolymers of propylene as well as copolymers of propylene with one or more monomers with which it (i.e., propylene) is copolymerizable such as ethylene, 1-butene, 1-pentene, 1-hexene, 1-octene, one or more conjugated or non-conjugated dienes, and combinations of two or more of these comonomers. Preferably the polypropylene is a high crystallinity polypropylene, more preferably a high crystallinity polypropylene with a MFR$\leq$12 g/10 min (230° C./2.16 kg), more preferably with a MFR$\leq$4 g/10 min (230° C./2.16 kg). In one embodiment the high crystallinity polypropylene is a propylene homopolymer or mini-random copolymer (i.e., a propylene copolymer comprising 98% to less than 100% units derived from propylene monomer with the remainder of units derived from another olefin monomer, typically ethylene).

High crystallinity means that the polypropylene has crystallinity equal to or greater than 40%, preferably equal to or greater than 55%, as measured by differential scanning calorimetry (DSC) heat of fusion. DSC is a common technique that can be used to examine the melting and crystallization of crystalline and semi-crystalline polymers. General principles of DSC measurements and applications of DSC to studying crystalline and semi-crystalline polymers are described in standard texts (for instance, E. A. Turi, ed., "Thermal Characterization of Polymeric Materials", Academic Press, 1981).

The term "crystallinity" refers to the regularity of the arrangement of atoms or molecules forming a crystal structure. Polymer crystallinity can be examined using DSC. $T_{me}$ means the temperature at which the melting ends and $T_{max}$ means the peak melting temperature, both as determined by one of ordinary skill in the art from DSC analysis using data from the final heating step. One suitable method for DSC analysis uses a model Q1000™ DSC from TA Instruments, Inc. Calibration of the DSC is performed in the following manner. First, a baseline is obtained by heating the cell from −90° C. to 290° C. without any sample in the aluminum DSC pan. Then 7 milligrams of a fresh indium sample is analyzed by heating the sample to 180° C., cooling the sample to 140° C. at a cooling rate of 10° C./min followed by keeping the sample isothermally at 140° C. for 1 minute, followed by heating the sample from 140° C. to 180° C. at a heating rate of 10° C./min. The heat of fusion and the onset of melting of the indium sample are determined and checked to be within 0.5° C. from 156.6° C. for the onset of melting and within 0.5 J/g from 28.71 J/g for the heat of fusion. Then deionized water is analyzed by cooling a small drop of fresh sample in the DSC pan from 25° C. to −30° C. at a cooling rate of 10° C./min. The sample is kept isothermally at −30° C. for 2 minutes and heated to 30° C. at a heating rate of 10° C./min. The onset of melting is determined and checked to be within 0.5° C. from 0° C.

Samples of polymer are pressed into a thin film at a temperature of 177° C. About 5 to 8 mg of sample is weighed out and placed in a DSC pan. A lid is crimped on the pan to ensure a closed atmosphere. The sample pan is placed in the DSC cell and then heated at a high rate of about 100° C./min to a temperature of 230° C. The sample is kept at this temperature for about 3 minutes. Then the sample is cooled at a rate of 10° C./min to −40° C., and kept isothermally at that temperature for 3 minutes. Consequently the sample is heated at a rate of 10° C./min until melting is complete. The resulting enthalpy curves are analyzed for peak melt temperature, onset and peak crystallization temperatures, heat of fusion and heat of crystallization, $T_{me}$, $T_{max}$, and any other quantity of interest from the corresponding thermograms as described in U.S. Pat. No. 6,960,635. The factor that is used to convert heat of fusion into nominal weight percent crystallinity is 165 J/g=100 wt % crystallinity. With this conversion factor, the total crystallinity of a propylene-based polymer (units: weight percent crystallinity) is calculated as the heat of fusion divided by 165 J/g and multiplied by 100 percent. For impact copolymers the elastomeric impact modifier contributes negligibly to heat of fusion. As such, to calculate the crystallinity of impact copolymers in the context of determining whether the copolymer is of "high crystallinity", the result of the above calculation is further divided by a factor equal to one minus the weight fraction of elastomeric impact modifier.

In one embodiment the polypropylene used in the practice of this invention is an impact-modified polypropylene. These propylene polymers have a continuous phase which is comprised of a propylene polymer, and an elastomeric phase. The propylene polymer of the continuous phase typically will be a homopolymer propylene polymer or a random or mini-random propylene copolymer, more typically a homopolymer propylene polymer. The propylene polymer may be made using a Ziegler-Natta catalyst, constrained geometry catalyst, metallocene catalyst, or any other suitable catalyst system. When the propylene polymer making up the continuous phase is a homopolymer propylene polymer, the crystallinity of the propylene polymer, as determined by DSC, is preferably at least about 50 percent, more preferably at least about 55 percent, most preferably at least about 62 percent.

The elastomeric phase may be made using a constrained geometry catalyst, Ziegler-Natta catalyst, metallocene catalyst or any other suitable catalyst. Ethylene propylene rubbers are typically made in the second of two reactors coupled in series. Preferred blended elastomers include, but are not limited to, ethylene-octene, ethylene-butylene and ethylene-hexene. Typically, the elastomeric content of the impact propylene copolymer or the blend is from 8 to 40, more typically from 12 to 25 and most typically from 15 to 20 wt % based on the weight of the copolymer or blend. In one embodiment, an acceptable substitute for an impact-modified polypropylene component of the composition of this invention is polypropylene homopolymer or mini-random polymer in combination with a polymeric elastomer such as an ethylene-propylene copolymer, each added separately to the composition and in an amount similar to their respective amounts in an impact modified propylene polymer, e.g., 80-90 wt % propylene homopolymer and/or mini-random polymer and 10-20 wt % elastomer.

Certain impact propylene copolymers that can be used in the practice of this invention are more fully described in U.S. Pat. Nos. 6,472,473 and 6,841,620.

Compatibilizer (Component C)

The compatibilizer component of the composition of this invention is an amine-functionalized, elastomeric olefin polymer. These functionalized polymers are made from olefin elastomers, typically polyolefin interpolymers and preferably polyolefin multi-block interpolymers. Examples of the polyolefin interpolymers are the ethylene/α-olefin interpolymers, the propylene/α-olefin interpolymers and multi-block ethylene/α-olefin interpolymers. The α-olefin is preferably a $C_{3-20}$ linear, branched or cyclic α-olefin (for the propylene/α-olefin interpolymers, ethylene is considered an α-olefin). Examples of $C_{3-20}$ α-olefins include propene, 1-butene, 4-methyl-1-pentene, 1-hexene, 1-octene, 1-decene, 1-dodecene, 1-tetradecene, 1-hexadecene, and 1-octadecene. The α-olefins can also contain a cyclic structure such as cyclohexane or cyclopentane, resulting in a α-olefin such as 3-cyclohexyl-1-propene (allyl cyclohexane) and vinyl cyclohexane. Although not α-olefins in the classical sense of the term, for purposes of this invention certain cyclic olefins, such as norbornene and related olefins, are α-olefins and can be used in place of some or all of the V-olefins described above. Illustrative polyolefin copolymers include ethylene/propylene, ethylene/butene, ethylene/1-hexene, ethylene/1-octene, and the like. Illustrative terpolymers include ethylene/propylene/1-octene, ethylene/propylene-/butene, ethylene/butene/1-octene, and ethylene/butene/styrene.

In one embodiment of this invention the compatibilizer is an amine-functionalized, elastomeric olefin block copolymer. An "olefin block copolymer", (or "OBC"), olefin block interpolymer", "multi-block interpolymer", "segmented interpolymer" is a polymer comprising two or more chemically distinct regions or segments (referred to as "blocks") preferably joined in a linear manner, that is, a polymer comprising chemically differentiated units which are joined end-to-end with respect to polymerized olefinic, preferable ethylenic, functionality, rather than in pendent or grafted fashion. In an embodiment, the blocks differ in the amount or type of incorporated comonomer, density, amount of crystallinity, crystallite size attributable to a polymer of such composition, type or degree of tacticity (isotactic or syndiotactic), regio-regularity or regio-irregularity, amount of branching (including long chain branching or hyper-branching), homogeneity or any other chemical or physical property. Compared to block interpolymers of the prior art, including interpolymers produced by sequential monomer addition, fluxional catalysts, or anionic polymerization techniques, the multi-block interpolymers used in the practice of this disclosure are characterized by unique distributions of both polymer polydispersity (PDI or Mw/Mn or MWD), block length distribution, and/or block number distribution, due, in an embodiment, to the effect of the shuttling agent(s) in combination with multiple catalysts used in their preparation. More specifically, when produced in a continuous process, the polymers desirably possess PDI from 1.7 to 3.5, preferably from 1.8 to 3, more preferably from 1.8 to 2.5, and most preferably from 1.8 to 2.2. When produced in a batch or semi-batch process, the polymers desirably possess PDI from 1.0 to 3.5, preferably from 1.3 to 3, more preferably from 1.4 to 2.5, and most preferably from 1.4 to 2.

The term "ethylene multi-block interpolymer" is a multi-block interpolymer comprising ethylene and one or more interpolymerizable comonomers, in which ethylene comprises a plurality of the polymerized monomer units of at least one block or segment in the polymer, preferably at least 90, more preferably at least 95 and most preferably at least 98, mole percent of the block. Based on total polymer weight, the ethylene multi-block interpolymers used in the practice of the present disclosure preferably have an ethylene content from 25 to 97, more preferably from 40 to 96, even more preferably from 55 to 95 and most preferably from 65 to 85, percent.

Because the respective distinguishable segments or blocks formed from two of more monomers are joined into single polymer chains, the polymer cannot be completely fractionated using standard selective extraction techniques. For example, polymers containing regions that are relatively crystalline (high density segments) and regions that are relatively amorphous (lower density segments) cannot be selectively extracted or fractionated using differing solvents. In an embodiment the quantity of extractable polymer using either a dialkyl ether or an alkane-solvent is less than 10, preferably less than 7, more preferably less than 5 and most preferably less than 2, percent of the total polymer weight.

In a further embodiment, the olefin block polymers used in this embodiment of the invention, especially those made in a continuous, solution polymerization reactor, possess, before functionalization with an amine, a most probable distribution of block lengths. In one embodiment of this disclosure, the ethylene multi-block interpolymers are defined as having, prior to functionalization with an amine:

(A) Mw/Mn from about 1.7 to about 3.5, at least one melting point, Tm, in degrees Celsius, and a density, d, in grams/cubic centimeter, where in the numerical values of Tm and d correspond to the relationship $$Tm > -2002.9 + 4538.5(d) - 2422.2(d)^2, \text{ or}$$

(B) Mw/Mn from about 1.7 to about 3.5, and is characterized by a heat of fusion, $\Delta H$ in J/g, and a delta quantity, $\Delta T$, in degrees Celsius defined as the temperature difference between the tallest DSC peak and the tallest CRYSTAF peak, wherein the numerical values of $\Delta T$ and $\Delta H$ have the following relationships:

$$\Delta T > -0.1299(\Delta H) + 62.81 \text{ for } \Delta H \text{ greater than zero}$$
$$\text{and up to } 130 \text{ J/g } \Delta T \geq 48° \text{ C. for } \Delta H \text{ greater}$$
$$\text{than } 130 \text{ J/g}$$

wherein the CRYSTAF peak is determined using at least 5 percent of the cumulative polymer, and if less than 5 percent of the polymer has an identifiable CRYSTAF peak, then the CRYSTAF temperature is 30° C.; or (C) Elastic recovery, Re, in percent at 300 percent strain and 1 cycle measured with a compression-molded film of the ethylene/α-olefin interpolymer, and has a density, d, in grams/cubic centimeter, wherein the numerical values of Re and d satisfy the following relationship when ethylene/α-olefin interpolymer is substantially free of crosslinked phase:

$$Re > 1481 - 1629(d); \text{ or}$$

(D) Has a molecular weight fraction which elutes between 40 C and 130 C when fractionated using TREF, characterized in that the fraction has a molar comonomer content of at least 5 percent higher than that of a comparable random ethylene interpolymer fraction eluting between the same temperatures, wherein said comparable random ethylene interpolymer has the same comonomer(s) and has a melt index, density and molar comonomer content (based on the whole polymer) within 10 percent of that of the ethylene/α-olefin interpolymer; or (E) Has a storage modulus at 25° C., G'(25° C.), and a storage modulus at 100° C., G'(100° C.), wherein the ratio of G'(25° C.) to G'(100° C.) is in the range of about 1:1 to about 9:1. The ethylene/α-olefin interpolymer may also have:

(F) Molecular fraction which elutes between 40° C. and 130° C. when fractionated using TREF, characterized in that the fraction has a block index of at least 0.5 and up to about 1 and a molecular weight distribution, Mw/Mn, greater than about 1.3; or (G) Average block index greater than zero and up to about 1.0 and a molecular weight distribution, Mw/Mn greater than about 1.3.

The ethylene multi-block interpolymers useful in the practice of this invention, and their preparation and use, are more fully described in U.S. Pat. Nos. 7,579,408, 7,355,089, 7,524,911, 7,514,517, 7,582,716 and 7,504,347.

The olefin elastomer is functionalized with one or more amine groups, e.g., NHR in which R is hydrogen, alkyl or aryl, preferably alkyl or aryl and more preferably alkyl of 1-10 carbon atoms. These amine groups can be either incorporated into the polymer by either including an amine-bearing olefin monomer into the backbone of the polymer (or adding an amine group to a unit of the polymer backbone) or, preferably, grafting a suitable compound, e.g., maleic anhydride, onto the polymer backbone and then reacting the grafted compound with an amine-bearing compound, e.g., a diamine.

In one embodiment grafting may occur by way of free radical functionalization which typically includes melt blending an olefin polymer, a free radical initiator (such as a peroxide or the like), and a compound containing a functional group. During melt blending, the free radical initiator reacts (reactive melt blending) with the olefin polymer to form polymer radicals. The compound containing a functional group bonds to the backbone of the polymer radicals to form a functionalized polymer. In one embodiment the grafting monomer is maleic anhydride and once grafted to the polymer backbone, the pendant anhydride or carboxylic group is reacted with an amine, e.g., $H_2N-R-NH_2$ in which R is an alkyl radical of 1-8 carbon atoms, to provide the functional amide group of the polymer. Suitable grafting techniques are further described in U.S. Pat. Nos. 3,236,917 and 5,194,509 and WO 2006/102016, WO 2008/080801 and WO 2008/079784.

More specific examples of olefin elastomers useful in the preparation of the compatibilizer of this invention include very low density polyethylene (VLDPE) (e.g., FLEXOMER® ethylene/1-hexene polyethylene made by The Dow Chemical Company), homogeneously branched, linear ethylene/α-olefin copolymers (e.g. TAFMER® by Mitsui Petrochemicals Company Limited and EXACT® by Exxon Chemical Company), homogeneously branched, substantially linear ethylene/α-olefin polymers (e.g., AFFINITY® and ENGAGE® polyethylene available from The Dow Chemical Company), and olefin block copolymers such as those described in U.S. Pat. No. 7,355,089 (e.g., INFUSE® available from The Dow Chemical Company). The more preferred polyolefin copolymers are the homogeneously branched linear and substantially linear ethylene copolymers. The substantially linear ethylene copolymers are especially preferred, and are more fully described in U.S. Pat. Nos. 5,272,236, 5,278,272 and 5,986,028. Most preferred are the ethylene multi-block interpolymers.

The olefin elastomers useful in preparation of the compatibilizers useful in the practice of this invention also include propylene, butene and other alkene-based copolymers, e.g., copolymers comprising a majority of mer units derived from propylene and a minority of mer units derived from another α-olefin (including ethylene). Exemplary propylene polymers useful in the practice of this invention include the VERSIFY® polymers available from The Dow Chemical Company, and the VISTAMAXX® polymers available from ExxonMobil Chemical Company.

Blends of any of the above olefinic elastomers can also be used in preparation of the compatibilizers useful in the practice of this invention, and the olefin elastomers can be blended or diluted with one or more other polymers to the extent that, in a preferred mode, the olefin elastomers of this invention constitute at least about 50, preferably at least about 75 and more preferably at least about 80, weight percent of the thermoplastic polymer component of the blend and retain their flexibility. In a less preferred mode and depending on other properties that may be sought, the olefin elastomer content may be less than 50% of the thermoplastic polymer component.

The olefin elastomers, particularly the ethylene elastomers, useful in the preparation of the compatibilizers useful in the practice of this invention typically have, before grafting, a density of less than 0.91, preferably less than 0.90, grams per cubic centimeter (g/cm$^3$). The ethylene copolymers typically have a density greater than 0.85, preferably greater than 0.86, g/cm$^3$. Density is measured by the procedure of ASTM D-792. Generally, the greater the α-olefin content of the interpolymer, the lower the density and the more amorphous the interpolymer. Low density polyolefin copolymers are generally characterized as semi-crystalline, flexible and having good optical properties, e.g., high transmission of visible and UV-light and low haze.

The ethylene elastomers useful in the preparation of the compatibilizers useful in the practice of this invention typically have, before grafting, a melt index greater than 0.10 and preferably greater than 1 gram per 10 minutes (g/10 min). The ethylene elastomers typically have a melt index of less than 500 and preferably of less than 100, g/10 min. Melt index is measured by the procedure of ASTM D-1238 (190° C./2.16 kg).

In one embodiment the polymeric backbone of the compatibilizer is free of mer units derived from styrene and it does not contain any mer units containing a carboxylic acid or epoxy group. In one embodiment the compatibilizers of this invention may contain carboxylic acid functionality that is residual from the amination of the polymer grafted with maleic anhydride, for example, but the amount of this residual acid functionality is nominal, preferably none, but if present, it is of little or no consequence to the performance of the compatibilizer in the compositions of this invention.

Organic Phosphate Flame Retardant (Component D)

The organic phosphate flame retardants useful in the practice of this invention include both aromatic and aliphatic phosphate esters and their polymers. Examples of aliphatic phosphate ester flame retardants include trimethyl phosphate, tributyl phosphate, tri(2-ethylhexyl) phosphate, tributoxyethyl phosphate, monoisodecyl phosphate and 2-acryloyloxyethylacid phosphate. Examples of aromatic phosphate esters include trixylenyl phosphate, tris (phenyl-phenyl) phosphate, trinaphthyl phosphate, cresyldiphenyl phosphate, xylenyldiphenyl phosphate and dipheny-2-methacryloyloxyethyl phosphate. Examples of aromatic bis(phosphate esters) include resorcinol bis (diphenyl phosphate) (RDP), resorcinol bis (dixylenyl phosphate), resorcinol bis (dicresylphosphate), hydroquinone bis(dixylenyl phosphate), bisphenol-A bis(diphenyl phosphate) (BPADP) and tetrakis (2,6-dimethyl-phenyl)-1,3-phenylene bisphosphate. These phosphate esters can be used alone or in combination with one another. Preferred organic phosphate flame retardants are liquid under ambient conditions (23° C. and atmospheric pressure).

Optional Additives (Component E)

The compositions of this invention can, optionally, also contain additives. Representative additives include, but are not limited to, antioxidants, processing aids, colorants, ultraviolet stabilizers (including UV absorbers), antistatic agents, nucleating agents, slip agents, plasticizers, lubricants, viscosity control agents, tackifiers, anti-blocking agents, surfactants, extender oils, fillers, acid scavengers, and metal deactivators. If present, these additives are typically used, individually and/or collectively, in a conventional manner and in conventional amounts, e.g., from 0.01 wt % or less to 10 wt % or more, based on the total weight of the composition.

Suitable UV light stabilizers include hindered amine light stabilizers (HALS) and UV light absorber (UVA) additives. Representative HALS that can be used in the compositions include, but are not limited to, TINUVIN XT 850, TINUVIN 622, TINUVIN® 770, TINUVIN® 144, SANDUVOR® PR-31 and Chimassorb 119 FL. TINUVIN® 770 is bis-(2, 2,6,6-tetramethyl-4-piperidinyl)sebacate, has a molecular weight of about 480 grams/mole, is commercially available from Ciba, Inc. (now a part of BASF), and possesses two secondary amine groups. TINUVIN® 144 is bis-(1,2,2,6,6-pentamethyl-4-piperidinyl)-2-n-butyl-2-(3,5-di-tert-butyl-4-hydroxybenzyl)malonate, has a molecular weight of about 685 grams/mole, contains tertiary amines, and is also available from Ciba. SANDUVOR® PR-31 is propanedioic acid, [(4-methoxyphenyl)-methylene]-bis-(1,2,2,6,6-pentamethyl-4-piperidinyl)ester, has a molecular weight of about 529 grams/mole, contains tertiary amines, and is available from Clariant Chemicals (India) Ltd. Chimassorb 119 FL or Chimassorb 119 is 10 wt % of dimethyl succinate polymer with 4-hydroxy-2,2,6,6,-tetramethyl-1-piperidineethanol and 90 wt % of N,N'''-[1,2-Ethanediylbis[[[4,6-bis[butyl(1, 2,2,6,6-pentamethyl-4-piperidinyl)amino]-1,3,5-traizin-2-yl]imino]-3,1-propanediyl]] bis [N'N''-dibutyl-N'N''-bis(1,2, 2,6,6-pentamethyl-4-piperidinyl)]-1, is commercially available from Ciba, Inc. Representative UV absorber (UVA) additives include benzotriazole types such as Tinuvin 326 and Tinuvin 328 commercially available from Ciba, Inc. Blends of HAL's and UVA additives are also effective.

Examples of antioxidants include, but are not limited to, hindered phenols such as tetrakis[methylene(3,5-di-tert-butyl-4-hydroxyhydro-cinnamate)]methane; bis[(beta-(3,5-di-tert-butyl-4-hydroxybenzyl)-methylcarboxyethyl)]sulphide, 4,4'-thiobis(2-methyl-6-tert-butylphenol), 4,4'-thiobis(2-tert-butyl-5-methylphenol), 2,2'-thiobis(4-methyl-6-tert-butylphenol), and thiodiethylene bis(3,5-di-tert-butyl-4-hydroxy)hydrocinnamate; phosphites and phosphonites such as tris(2,4-di-tert-butylphenyl)phosphite and di-tert-butylphenyl-phosphonite; thio compounds such as dilaurylthiodipropionate, dimyristylthiodipropionate, and distearylthiodipropionate; various siloxanes; polymerized 2,2,4-trimethyl-1,2-dihydroquinoline, n,n'-bis(1,4-dimethylpentyl-p-phenylenediamine), alkylated diphenylamines, 4,4'-bis(alpha, alpha-dimethylbenzyl)diphenylamine, diphenyl-p-phenylenediamine, mixed di-aryl-p-phenylenediamines, and other hindered amine anti-degradants or stabilizers. Antioxidants can be used, for example, in amounts of 0.1 to 5 wt % based on the weight of the composition.

Examples of processing aids include, but are not limited to, metal salts of carboxylic acids such as zinc stearate or calcium stearate; fatty acids such as stearic acid, oleic acid, or erucic acid; fatty amides such as stearamide, oleamide, erucamide, or N,N'-ethylene bis-stearamide; polyethylene wax; oxidized polyethylene wax; polymers of ethylene oxide; copolymers of ethylene oxide and propylene oxide; vegetable waxes; petroleum waxes; non ionic surfactants; silicone fluids and polysiloxanes.

In certain embodiments of this invention, the compositions contain less than 10 wt %, preferably less than 5 wt %, of various metal oxides, e.g., titanium dioxide; metal carbonates such as magnesium carbonate and calcium carbonate, metal sulfides and sulfates such as molybdenum disulfide and barium sulfate; metal borates such as barium borate, meta-barium borate, zinc borate and meta-zinc borate; metal anhydride such as aluminum anhydride; halogens, and polymeric phosphates. In certain embodiments of this invention, the compositions are substantially free of these materials.

Flame Retardant Thermoplastic Composition

The relative amounts of each component of the composition of this invention are described in Table 1.

TABLE 1

Component Amounts (Wt %) in the Composition

| Component | Broad Range | Preferred Range | More Preferred Range |
| --- | --- | --- | --- |
| A | 35-80 | 42-70 | 46-80 |
| B | 10-35 | 10-28 | 10-24 |
| C | >0-40 | 2-15 | 5-15 |
| D | >0-30 | 5-15 | 5-15 |
| E | 0-10 | 0.5-3 | 0.5-3 |

In one embodiment, the weight ratio of A to B (polycarbonate (PC) to polypropylene (PP)) is greater than (>) 1, preferably >1.5 and more preferably >2. In one embodiment, the weight ratio of PC to PP is of 1:1 to 8:1, preferably 1.5:1 to 8:1 and more preferably 2:1 to 8:1.

Compounding/Fabrication

Compounding of the compositions of this invention can be performed by standard means known to those skilled in the art. Examples of compounding equipment are internal batch mixers, such as a BANBURY or BOLLING internal mixer. Alternatively, continuous single or twin screw mixers can be used, such as a FARREL continuous mixer, a WERNER AND PFLEIDERER twin screw mixer, or a BUSS kneading continuous extruder. The type of mixer utilized, and the operating conditions of the mixer, will affect properties of the composition such as viscosity, volume resistivity, and extruded surface smoothness.

The compounding temperature of the polycarbonate, polypropylene, compatibilizer and organic phosphate flame retardant and optional additive packages will vary with the composition, but it is typically in excess of 220° C. For a 3:1 weight ratio of polycarbonate to polypropylene, the compounding temperature is typically in excess of 245° C. The various components of the final composition can be added to and compounded with one another in any order, or simultaneously, but typically the polycarbonate, polypropylene and compatibilizer are first compounded with one another, and then with the flame retardant, and then with the additives. In some embodiments the additives are added as a pre-mixed masterbatch. Such masterbatches are commonly formed by dispersing the additives, either separately or together, in a small amount of one or more of the polycarbonate and polypropylene. Masterbatches are conveniently formed by melt compounding methods.

Articles of Manufacture

In one embodiment the composition of this invention can be applied as a covering to a cable, e.g., like a sheath or insulation layer, in known amounts and by known methods (for example, with the equipment and methods described in U.S. Pat. Nos. 5,246,783 and 4,144,202). Typically, the polymer composition is prepared in a reactor-extruder equipped with a cable-coating die and after the components of the composition are formulated, the composition is extruded over the cable as the cable is drawn through the die.

Other articles of manufacture that can be prepared from the polymer compositions of this invention include fibers, ribbons, sheets, tapes, pellets, tubes, pipes, weather-stripping, seals, gaskets, foams, footwear and bellows. These articles can be manufactured using known equipment and techniques.

The compositions of this invention exhibit one or more of robust sandpaper abrasion resistance, scrape abrasion resistance, pinch resistance, flame resistance, and hot water resistance for automotive wires with reduced wall thickness (e.g., 0.2 mm or less) according to ISO 6722.

The invention is described more fully through the following examples. Unless otherwise noted, all parts and percentages are by weight.

Specific Embodiments

Materials and Methods

The PP/PC blends as shown in Table 2 are first mixed in a BRABENDER mixing bowl and are then extruded in a ¾" single-screw BRABENDER extruder to make wires with 0.2 mm insulation layer. The wire construction used is 18 AWG/19 strand bare copper.

PP1 is an impact copolymer with MFR of 2.1 g/10 min (230° C./2.16 kg), density of 0.900 g/cm$^3$, 1% secant flexural modulus of 1720 MPa, notched Izod impact at 23° C. of 560 J/m, and deflection temperature of 116° C. under load of 0.45 MPa, comprising a melt compounded blend of 82% by weight of a nucleated high crystallinity (63%) polypropylene homopolymer plus 18% by weight of an ethylene/α-olefin copolymer with melt index of 1.0 g/10 min (190° C./2.16 kg) and density of 0.902 g/cm$^3$.

PP2 is a nucleated, high crystallinity (58%) polypropylene copolymer with an MFR of 3.0 g/10 min (230° C./2.16 kg), density of 0.900 g/cm$^3$, 1% secant flexural modulus of 2070 MPa, notched Izod impact at 23° C. of 37 J/m, and deflection temperature of 129° C. under load of 0.45 MPa.

PP3 is a high crystallinity (54%) polypropylene homopolymer with an MFR of 38 g/10 min (230° C./2.16 kg), a density of 0.900 g/cm$^3$, 1% secant flexural modulus of 1240 MPa, notched Izod impact at 23° C. of 27 J/m, and deflection temperature of 104° C. under load of 0.45 MPa.

PC1 is a polycarbonate resin with a melt index of 6 g/10 min (300° C./1.2 kg), density of 1.20 g/cm$^3$, flexural modulus of 2410 MPa, notched Izod impact of 907 J/m, tensile elongation at break of 150%, and tensile strength at break of 72 MPa.

PC2 is a polycarbonate resin with a melt index of 73 g/10 min (300° C./1.2 kg), density of 1.20 g/cm$^3$, flexural modulus of 2300 MPa, notched Izod impact of 267 J/m, tensile elongation at break of 60%, and tensile strength at break of 48 MPa.

PC3 is an impact modified polycarbonate resin with a melt index of 18 g/10 min (300° C./1.2 kg), density of 1.18 g/cm$^3$, flexural modulus of 2280 MPa, notched Izod impact of 641 J/m, and tensile elongation at break of 110%.

BDP is bisphenol A bis(diphenyl phosphate).

IRGANOX 1010 (BASF) is a hindered phenolic antioxidant.

IRGAFOS 168 (BASF) is a trisarylphosphite heat stabilizer.

Aminated maleic anhydride grafted INFUSE™ 9500 and aminated maleic anhydride grafted AMPLIFY™ GR216 are prepared following the procedure below.

AMPLIFY™ GR216, polyolefin elastomer grafted with 0.99 wt % maleic anhydride available from The Dow Chemical Company, is converted to an amine functional product by imbibing the pellets of AMPLIFY™ GR216 (200 grams) with N-ethylethylenediamine (5.10 g) at room temperature in a sealed agitated system with imbibed pellets fed into a HAAKE RHEOMIX 3000p mixer with pneumatic ram and roller rotors with temperature setting of 180° C. and an initial rotor speed of 10 rpm which is increased stepwise to 60 rpm over 2 minutes. Materials are fluxed in the mixer for 10 minutes with product removed from the mixer, pressed into a sheet, and placed in a 75° C. vacuum oven overnight. Product is sealed until utilized in blends.

INFUSE™9500, an ethylene multi-block copolymer available from The Dow Chemical Company, is radically grafted with 1.06 wt % maleic anhydride and is subsequently converted to an amine functional product by imbibing the pellets of maleated INFUSE™9500 (200 g) with N-ethyl-ethylenediamine (9.15 mL) at room temperature in a sealed agitated system with imbibed pellets fed into a HAAKE RHEOMIX 3000p mixer with pneumatic ram and roller rotors with temperature setting of 170° C. and an initial rotor speed of 10 rpm which is increased stepwise to 60 rpm over 2 minutes. Materials are fluxed in the mixer for 10 minutes with product removed from the mixer, pressed into a sheet, and placed in a 75° C. vacuum oven overnight. Product is sealed until utilized in blends.

The scrape abrasion resistance is tested using the scrape tester according to ISO 6722. It is conducted with a needle scratching wire surface under 7N load. The number of cycles that the needle takes to abrade through the insulation is recorded. Sandpaper abrasion resistance is tested according to SAE J1678. It is conducted with a sandpaper sanding wire surface under 163 g load. The total length of sandpaper that is used to abrade through wire insulation is recorded. Resistance to pinch is measured according to SAE J1128. The wire sample is placed across a 3 mm diameter steel rod and is subjected to an increasing force applied with a mass at a rate of 2.3 kg/min. Resistance to pinch of the test sample is the average of 4 values. Hot water resistance tests are set up according to the following protocol: 14 feet of wires are immersed in a jar filled with 1% salt water. The wires are aged in hot water for 5 weeks in an 85° C. oven. Wires are considered to have good hot water resistance when the measured insulation resistance is greater than $10^9$ Ohm·mm. Flame resistance is tested following J1128 procedure. The time to extinguish needs to be less than 70 s to pass J1128 requirement.

TABLE 2

Experimental Compositions on PP/PC Blends

| | Minimum requirement | EXP 1 | EXP 2 | EXP 3 | EXP 4 | COMP 1 | COMP 2 |
|---|---|---|---|---|---|---|---|
| PP1 | — | 19.25 | 27 | 27 | 27 | | 57.75 |
| PP3 | | | | | | 33 | |
| PC1 | — | 57.75 | | 50 | | | 19.25 |
| PC2 | — | | 50 | | | 50 | |
| PC3 | — | | | | 50 | | |
| Aminated MAH grafted Amplify GR 216 | — | | 12 | 12 | 12 | 6 | |
| Aminated MAH grafted Infuse 9500 | — | 12 | | | | | 12 |
| BDP | — | 10 | 10 | 10 | 10 | 10 | 10 |
| Irgonox1010 | — | 0.5 | 0.5 | 0.5 | 0.5 | 0.5 | 0.5 |
| Irgonox168 | — | 0.5 | 0.5 | 0.5 | 0.5 | 0.5 | 0.5 |
| Scrape abrasion resistance (cycles) | 350 by Ford Global Wire specification ES-AU5T-1A348-AA | 514 | 168 | 138 | '147 | 55 | 174 |
| Sandpaper abrasion resistance (mm) | 200 by J1678 | 341 | — | — | — | — | — |
| Pinch resistance (lbs) | 1.98 by J1678 | 5.5 | 5.2 | 4.9 | 5.1 | 5.1 | 7.2 |
| Time to extinguish (s) | 70 by J1128 | 6 | 7 | 9 | 7 | 9 | 132 |
| Hot water resistance | Insulation resistance >$10^9$ Ohm·mm | PASS | PASS | PASS | PASS | | PASS |

In Table 2 EXP1 is a blend of PP1 and PC1 using aminated maleic-grafted INFUSE 9500 as compatibilizer. This composition shows excellent performance relative to the requirements for thin wiring insulation: high scrape abrasion resistance, high sandpaper abrasion resistance, good flame resistance, good hot water resistance and good pinch resistance. EXP1 is markedly superior to the comparative examples: relative to COMP1, it has far better scrape abrasion resistance, illustrating a surprisingly strong dependence on MFR of the polypropylene component of the blend; and relative to COMP2, it has much reduced time to extinguish a flame which is indicative of improved flame resistance for PC-rich compositions as compared to PP-rich compositions. Inventive examples EXP 2, 3, and 4 are blends of PP1 with PC2, PC1, and PC3, respectively, using aminated maleic-grafted AMPLIFY GR216. EXP2, 3, and 4 as compared to EXP1 have similarly excellent performance with the exception of scrape resistance which is lower, which comparison among inventive examples serves to illustrate the particularly preferred benefits of the aminated maleic-grafted olefinic block copolymer compatibilizer used in EXP1. Nonetheless, EXP2, 3, and 4 have advantaged performance relative to COMP1 and COMP2: relative to COMP1, better scrape abrasion resistance, further illustrating the benefit of lower MFR for the polypropylene component; and relative to COMP2, improved flame resistance, again illustrating the advantage of PC-rich compositions for flame resistance.

High Throughput Examples

Additional compositions are prepared with a retractable pin mixing sample forming device, the general design and operating process of which are described in WO 2007/095036. The compositions and their properties are shown in Table 3.

The specific pin mixing device has four symmetrically arrayed mixing pins and prepares 10 cm³ of blend and then injection molds a plaque with dimensions of 67 mm×67 mm×1.6 mm thick immediately after mixing is completed. Blend preparation involves two steps: (1) making masterbatches of polymer components plus the liquid phosphate flame retardant agent using a HAAKE batch mixer with either a 40 cm³ or 200 cm³ capacity bowl; and (2) making the final compounds using the retractable pin mixing device by combining masterbatches plus in some cases additional amounts of the resin components. For the pin mixing device, the initial step of preparing masterbatches with the liquid flame retardant allows for overall more efficient experimentation by reducing the mixing time for the second step of final compound preparation and also provides extra assurance of excellent homogeneity in the final blend. For other types of mixing devices, in particular for production-scale mixing devices, such a two-step blending process is generally unnecessary.

Blends prepared by the retractable pin mixing device correspond closely to blends prepared by more conventional equipment such as the HAAKE batch mixer and twin screw extruders as evidenced by generally excellent agreement of properties such as tensile properties, scratch resistance, and blend morphology as determined by microscopy. HAAKE operating conditions for masterbatch preparation are: (1) 10 minutes at 200° C. at 50 rpm for BDP/PP masterbatches; (2) 10 minutes at 260° C. at 50 rpm for BDP/PC masterbatches; and (3) 15 minutes at 260° C. at 50 rpm for BDP/compatibilizer/PC masterbatches. In all three cases, the BDP is added gradually over a 5 minute period to the molten polymers followed by an additional 5 minutes of mixing. For masterbatches with compatibilizer, the BDP addition is preceded by 5 minutes of mixing of the compatibilizer and PC. Operating conditions for the retractable pin mixing sample forming device are mixing time of 8 minutes, rotary pin motion mode of co-rotating diagonally opposed pins with the two pairs of pins rotating in opposite directions, rotary pin speed of 300 rpm, linear pin motion mode of adjacent pairs of pins moving together at constant speed with the two pairs of pins moving into and out of the mixing chamber 180 degrees out of phase, linear pin speed of 15 mm/sec, injection time into the mold of 1.6 seconds, and cooling time before de-molding of 30 seconds. Operating temperatures are varied depending on blend composition, ranging from 235° C. mixing temperature and 90° C. mold temperature for PC-rich compositions to 215° C. mixing temperature and 85° C. mold temperature for PP-rich compositions.

A specially developed scratch test method is used to measure the abrasion resistance of blend plaques produced by the pin mixing sample forming device. A servo-hydraulic materials testing machine (MTS Model 810) equipped with custom fixtures is used to perform this test. The plaque is rigidly mounted in a vertical orientation on a roller table. A stainless steel jacketed thermocouple with a hemispherical tip is rigidly mounted to the servo hydraulically actuated shaft of the test machine at the height of the plaque in perpendicular orientation to the surface of the plaque. A dead weight pulley system affixed to the roller table holding the plaque pulls the plaque firmly against the thermocouple tip and provides a constant normal load of the probe against the plaque of 700 g throughout the test.

The scratch test involves cyclic reciprocating linear motion of the scratching probe (i.e., the thermocouple) on the plaque. The test is run for 300 seconds at a frequency of 55 cycles per minute for a total of 275 cycles. At the completion of the test, the plaque is removed and the depth of the scratch is measured with a caliper. Greater scratch depth corresponds to poorer abrasion resistance and vice versa. The scratch depth values in Table 3 are the average of five replicate measurements. Scratch depth as measured by this custom method correlates very well, in an inverse fashion, with the scrape abrasion cycles measured on wire insulation by the standard method described previously. The excellent quality of this correlation is shown in the FIGURE. The correlation function is the following: Scrape abrasion cycles=3.94*(scratch depth in mm)^(-1.585). This correlation is illustrated in the FIGURE. Table 3 reports both the directly measured scratch depth and the corresponding scrape abrasion cycles as calculated using this correlation for various compositions.

TABLE 3

Blend Compositions and Their Abrasion Resistance

| Formulation | COMP3 | COMP4 | COMP5 | COMP6 | COMP7 | COMP8 | EXP5 | EXP6 | EXP7 | EXP8 | EXP9 | EXP10 | EXP11 |
|---|---|---|---|---|---|---|---|---|---|---|---|---|---|
| PC1 | 90 | | 66.825 | 44.55 | 22.275 | 22.275 | 66.825 | 66.825 | 44.55 | | | | |
| PC3 | | | | | | | | | | 66.825 | 44.55 | 66.825 | 44.55 |
| PP1 | | | | | | | | 10.395 | 32.67 | 10.395 | 32.67 | | |
| PP2 | | 90 | 22.275 | 44.55 | 66.825 | 54.945 | 10.395 | | | | | 10.395 | 32.67 |
| aminated MAH-grafted INFUSE 9500 | | | | | | 11.88 | 11.88 | 11.88 | 11.88 | 11.88 | 11.88 | 11.88 | 11.88 |
| BDP | 10 | 10 | 9.9 | 9.9 | 9.9 | 9.9 | 9.9 | 9.9 | 9.9 | 9.9 | 9.9 | 9.9 | 9.9 |
| Irg 1010 | | | 0.5 | 0.5 | 0.5 | 0.5 | 0.5 | 0.5 | 0.5 | 0.5 | 0.5 | 0.5 | 0.5 |
| Irg 168 | | | 0.5 | 0.5 | 0.5 | 0.5 | 0.5 | 0.5 | 0.5 | 0.5 | 0.5 | 0.5 | 0.5 |

TABLE 3-continued

Blend Compositions and Their Abrasion Resistance

| Formulation | COMP3 | COMP4 | COMP5 | COMP6 | COMP7 | COMP8 | EXP5 | EXP6 | EXP7 | EXP8 | EXP9 | EXP10 | EXP11 |
|---|---|---|---|---|---|---|---|---|---|---|---|---|---|
| scratch depth (mm) | 0.059 | 0.200 | 0.229 | 0.259 | 0.208 | 0.042 | 0.044 | 0.024 | 0.038 | 0.026 | 0.057 | 0.018 | 0.037 |
| scrape abrasion resistance (cycles) | 350 | 51 | 41 | 33 | 48 | 595 | 553 | 1455 | 702 | 1282 | 369 | 2296 | 733 |

The compositions EXP5 through EXP11 have markedly improved abrasion resistance relative to compositions COMP4 through COMP7 which lack one or more of the components which are present in the inventive compositions: in COMP5 through COMP7, the lacking component is the aminated elastomeric compatibilizer; and in COMP4, the lacking components are the polycarbonate and compatibilizer. Although COMP3 possesses reasonably good abrasion resistance, it lacks sufficient low temperature flexibility to be suitable for wiring insulation due to the relatively high glass transition temperature of polycarbonate, e.g., 145 C as reported in *Polymer Handbook*, 3$^{rd}$ Ed., J. Brandrup and E. H. Immergut (1989). Although COMP8 is comprised of the same components as EXP5 and although it possesses similarly good abrasion resistance, by inference to the flame resistance results of similar compositions in Table 2, namely COMP2 and EXP1 respectively, the PP-rich composition of COMP8 lacks sufficient flame resistance to be suitable for wiring insulation. Comparison of EXP6, EXP8, and EXP10 to EXP5 surprisingly shows an additional marked improvement in abrasion resistance if one or both of the polycarbonate and polypropylene components are impact modified. Further examination of the inventive examples illustrates that the higher PC/PP ratios are preferable for improved abrasion resistance.

What is claimed is:

1. A composition comprising in weight percent based on the weight of the composition:
   A. 35-80% of at least one bisphenol-A polycarbonate resin,
   B. 10-35% of at least one polypropylene with a melt flow rate (MFR)≤12 g/10 min as measured at 230° C./2.16 kg,
   C. Greater than zero (>) to 40% of at least one amine functionalized elastomeric polymer with a backbone free of mer units derived from styrene and free of any mer units containing an epoxy group,
   D. >0-30% of at least one organic phosphate flame retardant, and,
   E. 0-10% of one or more additives; and
the weight ratio of A to B is greater than (>) 1.

2. The composition of claim 1 in which the polypropylene has crystallinity of greater than 40%.

3. The composition of claim 1 in which the polycarbonate resin has a melt flow rate (MFR) of less than or equal to (≤) 75 grams per ten minutes (g/10 min) as measured at 250° C./1.2 kg and a tensile elongation at break of greater than 50%.

4. The composition of claim 1 in which the polypropylene is a propylene homopolymer or mini-random copolymer with a MFR≤4 g/10 min as measured at 230° C./2.16 kg.

5. The composition of claim 1 in which the amine functionalized elastomeric polymer is an amine functionalized ethylene multi-block interpolymer.

6. The composition of claim 1 in which the organic phosphate flame retardant is liquid under ambient conditions.

7. The composition of claim 1 in which the additives are present.

8. The composition of claim 1 substantially free of halogen, metal oxide and polymeric phosphate.

9. A wire insulation sheath comprising the composition of claim 1.

10. A wire comprising the insulation sheath of claim 9.

* * * * *